(12) United States Patent
Padaki et al.

(10) Patent No.: US 11,703,585 B2
(45) Date of Patent: Jul. 18, 2023

(54) DATA TRANSMISSION IN RANGING ROUNDS IN UWB COMMUNICATION SYSTEMS

(71) Applicant: Samsung Electronics Co., Ltd., Suwon-si (KR)

(72) Inventors: Aditya V. Padaki, Richardson, TX (US); Zheda Li, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 478 days.

(21) Appl. No.: 16/810,664

(22) Filed: Mar. 5, 2020

(65) Prior Publication Data

US 2020/0284897 A1 Sep. 10, 2020

Related U.S. Application Data

(60) Provisional application No. 62/846,982, filed on May 13, 2019, provisional application No. 62/845,457, (Continued)

(51) Int. Cl.
*G01S 13/76* (2006.01)
*H04W 84/18* (2009.01)
*G01S 11/08* (2006.01)

(52) U.S. Cl.
CPC .............. *G01S 13/765* (2013.01); *G01S 11/08* (2013.01); *H04W 84/18* (2013.01)

(58) Field of Classification Search
CPC ............................ G01S 13/765; H04W 84/18
See application file for complete search history.

(56) References Cited

U.S. PATENT DOCUMENTS 9,344,485 B2 5/2016 Smadi et al.
2015/0016359 A1 1/2015 Wang et al.
(Continued)

FOREIGN PATENT DOCUMENTS

KR 10-2013-0034827 A 4/2013

OTHER PUBLICATIONS

IEEE 802.15.4z MAC, IEEE P802.15 Working Group for Wireless Personal Area Networks (WPANs), IEEE P802.15-19-0034-00-004z, Dec. 2018, 51 pages. (Year: 2018).*

(Continued)

*Primary Examiner* — Jamal Javaid
*Assistant Examiner* — Ryan C Kavleski

(57) ABSTRACT

A method and apparatus of a first network entity in a wireless communication system supporting ranging capability is provided. The method comprises: identifying, in a ranging block, one or more ranging rounds to transmit a ranging control message (RCM) and ranging ancillary data; generating the RCM including an advanced ranging control information element (ARC IE) that includes a ranging method field, wherein the ranging method field includes a value that indicates whether a ranging round following the RCM is used for ranging ancillary information exchange; transmitting, to a second network entity, the ranging ancillary data in the ranging round following the RCM when the value included in the ranging method field corresponds to ranging ancillary information exchange; and receiving, from the second network entity, an acknowledgement (ACK) corresponding to the ranging ancillary data.

20 Claims, 20 Drawing Sheets

Related U.S. Application Data filed on May 9, 2019, provisional application No. 62/815,809, filed on Mar. 8, 2019.

(56) References Cited

U.S. PATENT DOCUMENTS

| | | |
|---|---|---|
| 2015/0085686 A1 | 3/2015 | Chande et al. |
| 2016/0366578 A1 | 12/2016 | Abraham et al. |
| 2018/0249437 A1* | 8/2018 | Lindskog .............. G01S 5/0205 |
| 2019/0135229 A1* | 5/2019 | Ledvina .................. G01S 13/76 |

OTHER PUBLICATIONS

IEEE, "P802.15.4z/D00 Draft Standard for Low-Rate Wireless Networks, Amendment: Enhanced Ultra Wide-Band (UWB) Physical layers (PHYs) and Associated Ranging Techniques," Feb. 22, 2019, 119 pages.*

Lee, Jack, "IEEE 802.15.4z MAC for Ranging," Dec. 2018, IEEE Working Group, pp. 5-36. (Year: 2018).*

International Search Report and Written Opinion of the International Searching Authority in connection with International Application No. PCT/.KR2020/003207 dated Jun. 17, 2020, 9 pages.

"IEEE Standard for Wireless Medium Access Control (MAC) and Physical Layer (PHY) Specifications for Peer Aware Communications (PAC)", IEEE Computer Society, IEEE Std 802.15.8TM, Dec. 2017, 322 pages.

"Part 15.4: Wireless Medium Access Control (MAC) and Physical Layer (PHY) Specifications for Low-Rate Wireless Personal Area Networks (WPANs); Amendment 1: Add Alternate PHYs", LAN/MAN Standards Committee, IEEE Computer Society, IEEE Std 802.15.4a™—2007, Aug. 2007, 203 pages.

"IEEE 802.15.4z Mac", IEEE P802.15 Working Group for Wireless Personal Area Networks (WPANs), IEEE P802 15-19-0034 -00-004z, Dec. 2018, 51 pages.

"P802.15.4z/D00 Draft Standard for Low-Rate Wireless Networks, Amendment: Enhanced Ultra Wide-Band (UWB) Physical Layers (PHYs) and Associated Randing Techniques", Feb. 22, 2019, 119 pages.

Supplementary European Search Report dated Mar. 23, 2022 in connection with European Patent Application No. 20 77 1026, 6 pages.

* cited by examiner

| Bits: 2 | 4 | 1 | 1 | 1 | 1 | 6 | 6 | Octets: 2 | 2 | 1 |
|---|---|---|---|---|---|---|---|---|---|---|
| Cast Mode | Ranging Mode | Schedule Mode | Deferred Mode | Time Structure Indicator | Block Length Multiplier | Number of Active Ranging Rounds | Minimum Block Length | Ranging Round Length | Ranging Slot Length |

| Bits: 2 | 2 | 2 | 1 | 1 | 1 | 6 | 6 | 3 | Octets: 2 | 2 | 1 |
|---|---|---|---|---|---|---|---|---|---|---|---|
| Multi-node Mode | Ranging Method | STS Packet Config | Schedule Mode | Deferred Mode | Time Structure Indicator | Block Length Multiplier | Number of Active Ranging Rounds | Reserved | Minimum Block Duration | Ranging Round Length | Ranging Slot Length |

| Octets : 1 | Variable |
|---|---|
| RS Table Length | RS Table |

| Octets : 1 | Octets : 2/6/8 | Bits : 1 |
|---|---|---|
| Slot Index | Address field | Device Type |

| Ranging Mode Value | Ranging frame type and method |
|---|---|
| 10 | Non-Secure Ranging Ancillary Data (in payload) |
| 11 | Secure Ranging Ancillary Data (in payload) |

FIG. 16

| Ranging Mode Value | Ranging frame type and method |
|---|---|
| 10 | Ranging Round Message without RFRAME |
| 11 | Non-Secure Ranging Round Message with RFRAME |
| 12 | Secure Ranging Round with RFRAME |

FIG. 17

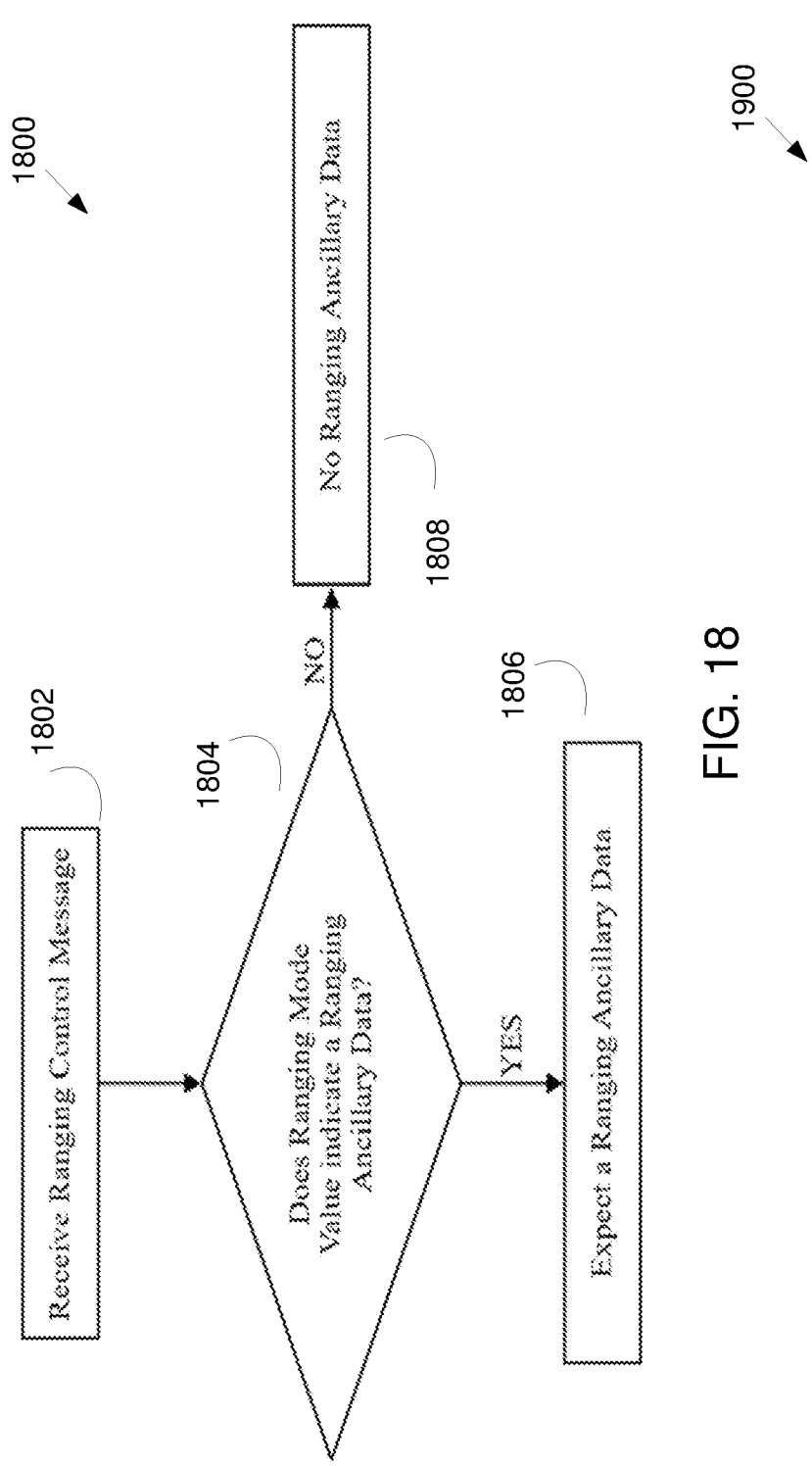

| Bits: 2 | 2 | 2 | 1 | 1 | 1 | 6 | 1 | Octets: 2 | 2 | 2 | 1 |
|---|---|---|---|---|---|---|---|---|---|---|---|
| Multi-node Mode | Ranging Method | STS Packet Config | Schedule Mode | Deferred Mode | Time Structure Indicator | Number of Active Ranging Rounds | Ranging Ancillary Data (in payload) | Reserved | Minimum Block Duration | Ranging Round Length | Ranging Slot Length |

FIG. 21

DATA TRANSMISSION IN RANGING ROUNDS IN UWB COMMUNICATION SYSTEMS

CROSS-REFERENCE TO RELATED APPLICATIONS AND CLAIM OF PRIORITY

The present application claims priority to:
U.S. Provisional Patent Application No. 62/815,809 filed on Mar. 8, 2019;
U.S. Provisional Patent Application No. 62/845,457 filed on May 9, 2019; and
U.S. Provisional Patent Application No. 62/846,982 filed on May 13, 2019.
The content of the above-identified patent documents is incorporated herein by reference.

TECHNICAL FIELD

The present disclosure relates generally to data transmission in ranging rounds in UWB communication systems.

BACKGROUND

A peer aware communication (PAC) network is a fully distributed communication network that allows direct communication among the PAC devices (PDs). A PAC device is an electronic device that has communication capability. Additionally, The PAC device can also have ranging capability. The PAC device may be referred to as a ranging device (RDEV), or an enhanced ranging device (ERDEV), or a secure ranging device (SRDEV) or any other similar name. RDEV, ERDEV, or SRDEV can be a part of an access point (AP), a station (STA), an eNB, a gNB, a UE, or any other communication node with ranging capability as defined in IEEE standard specification. PAC networks may employ several topologies like mesh, star, etc. to support interactions among the PDs for various services.

SUMMARY

Embodiments of the present disclosure provide data transmission in ranging rounds in UWB communication systems.

In one embodiment, a first network entity in a wireless communication system supporting ranging capability is provided. The first network entity comprises a processor configured to: identify, in a ranging block, one or more ranging rounds to transmit a ranging control message (RCM) and ranging ancillary data; and generate the RCM including an advanced ranging control information element (ARC IE) that includes a ranging method field, wherein the ranging method field includes a value that indicates whether a ranging round following the RCM is used for ranging ancillary information exchange. The first network further comprises a transceiver operably connected to the processor, the transceiver configured to: transmit, to a second network entity, the ranging ancillary data in the ranging round following the RCM when the value included in the ranging method field corresponds to ranging ancillary information exchange; and receive, from the second network entity, an acknowledgement (ACK) corresponding to the ranging ancillary data.

In another embodiment, a second network entity in a wireless communication system supporting ranging capability is provided. The second network entity comprises a processor configured to identify, in a ranging block, one or more ranging rounds to transmit a ranging control message (RCM) and ranging ancillary data. The second network further comprises a transceiver operably connected to the processor, the transceiver configured to receive, from a first network entity, the ranging ancillary data in the ranging round following the RCM when a value that is included in a ranging method field corresponds to a ranging ancillary information exchange, and transmit, to the first network entity, an acknowledgement (ACK) corresponding to the ranging ancillary data, wherein: the RCM includes an advanced ranging control information element (ARC IE) that includes a ranging method field; and the ranging method field includes the value that indicates whether a ranging round following the RCM is used for ranging ancillary information exchange.

In yet another embodiment, a method of a first network entity in a wireless communication system supporting ranging capability is provided. The method comprises: identifying, in a ranging block, one or more ranging rounds to transmit a ranging control message (RCM) and ranging ancillary data; generating the RCM including an advanced ranging control information element (ARC IE) that includes a ranging method field, wherein the ranging method field includes a value that indicates whether a ranging round following the RCM is used for ranging ancillary information exchange; transmitting, to a second network entity, the ranging ancillary data in the ranging round following the RCM when the value included in the ranging method field corresponds to ranging ancillary information exchange; and receiving, from the second network entity, an acknowledgement (ACK) corresponding to the ranging ancillary data.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The term "ranging," as well as derivatives thereof, mean that the fundamental measurements for ranging between devices are achieved by a transmission and a reception of one or more messages. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates an example advanced ranging control IE as defined in 802.15.4z according to embodiments of the present disclosure;

FIG. 11 illustrates an example advanced ranging control IE content field format as defined in 802.15.4z according to embodiments of the present disclosure;

FIG. 12 illustrates an example ranging scheduling IE according to embodiments of the present disclosure;

FIG. 13 illustrates an example row of ranging scheduling table according to embodiments of the present disclosure;

FIG. 16 illustrates an example ranging mode value for ranging ancillary data (in payload) according to embodiments of the present disclosure;

FIG. 17 illustrates an example ranging mode value for ranging ancillary data (in payload) with and without RFRAME according to embodiments of the present disclosure;

FIG. 18 illustrates a flow chart of a method for utilizing ranging mode value to indicate ranging ancillary data (in payload) according to embodiments of the present disclosure;

FIG. 19 illustrates an example ranging ancillary data (in payload) IE according to embodiments of the present disclosure;

FIG. 21 illustrates an example ranging ancillary data (in payload) bit in ARC IE to indicate ranging ancillary data transfer according to embodiments of the present disclosure;

DETAILED DESCRIPTION

FIG. 1 through FIG. 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: IEEE Standard for Wireless Medium Access Control (MAC) and Physical Layer (PHY) Specifications for Peer Aware Communications, IEEE Std 802.15.8, 2017; IEEE Standard Wireless Medium Access Control (MAC) and Physical Layer (PHY) Specifications for Low Rate Wireless Personal Area Networks (WPANs), Amendment 1: Add Alternative PHYs, IEEE Std 802.15.4a (2007); and IEEE 802.15.4z MAC, Available: https://mentor.ieee.org/802.15/dcn/19/15-19-0034-02-004z-ieee-802-15-4z-mac.docx.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 1:
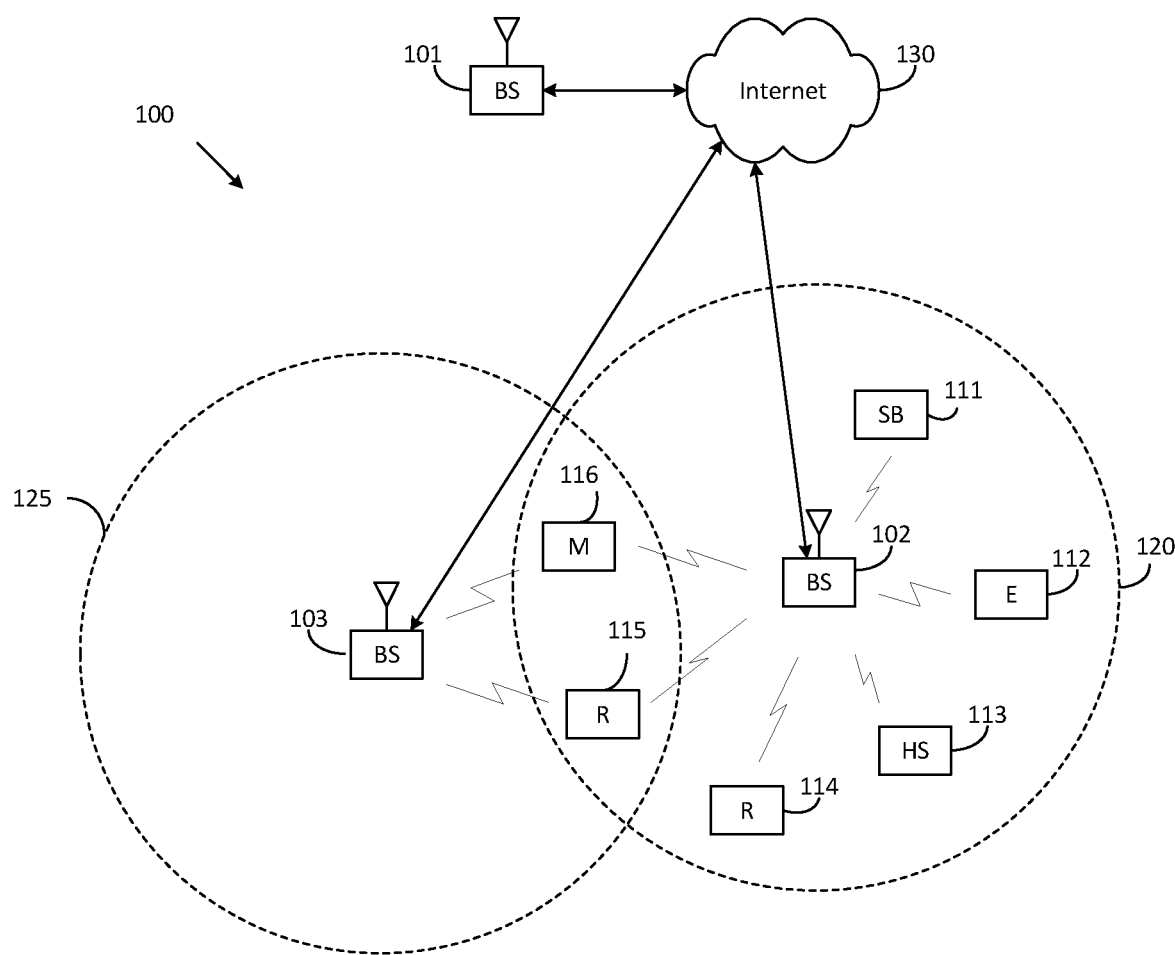
FIG. 1 illustrates an example wireless network according to embodiments of the present disclosure.
Figure 2:
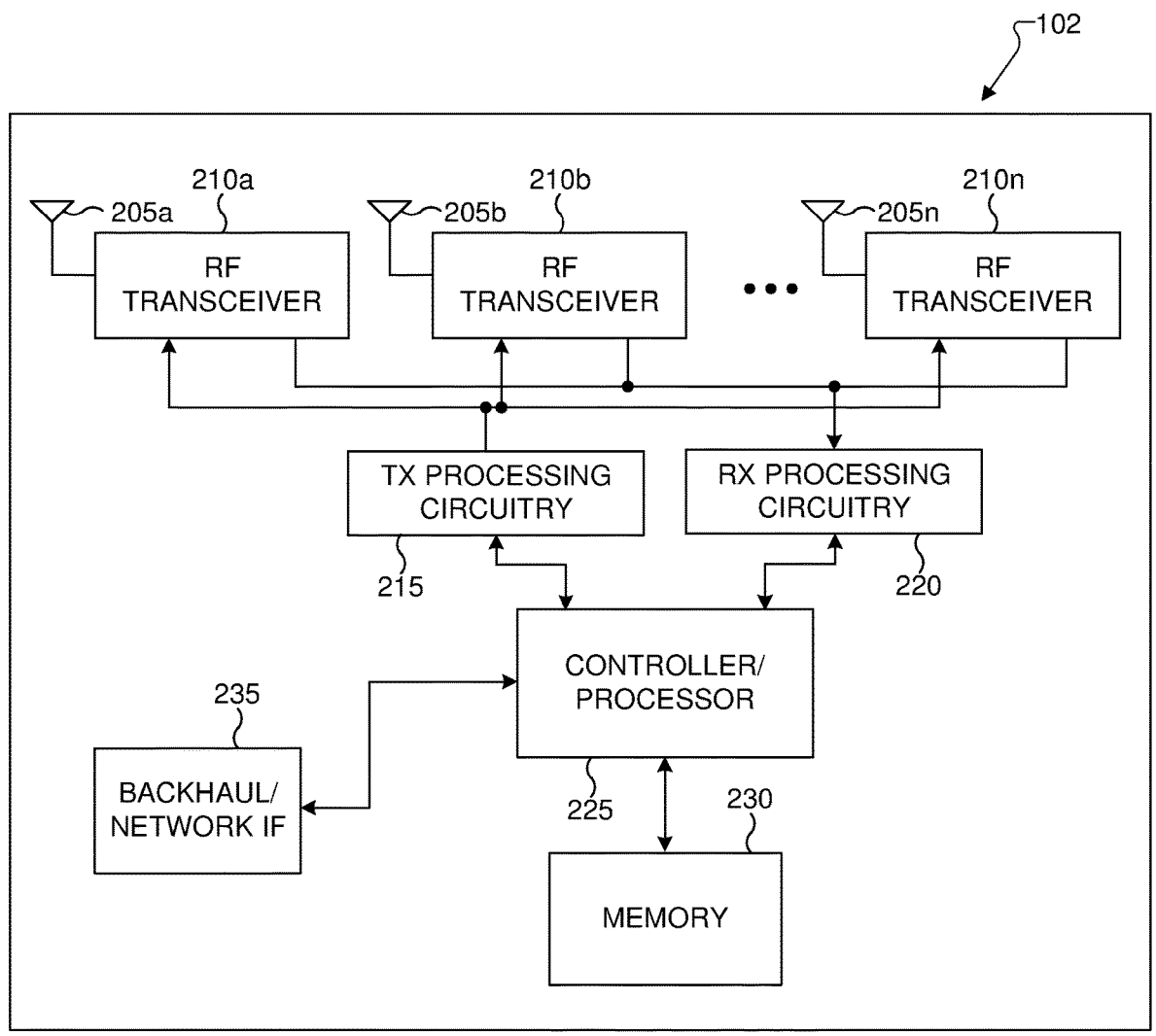
FIG. 2 illustrates an example gNB according to embodiments of the present disclosure.
Figure 3:
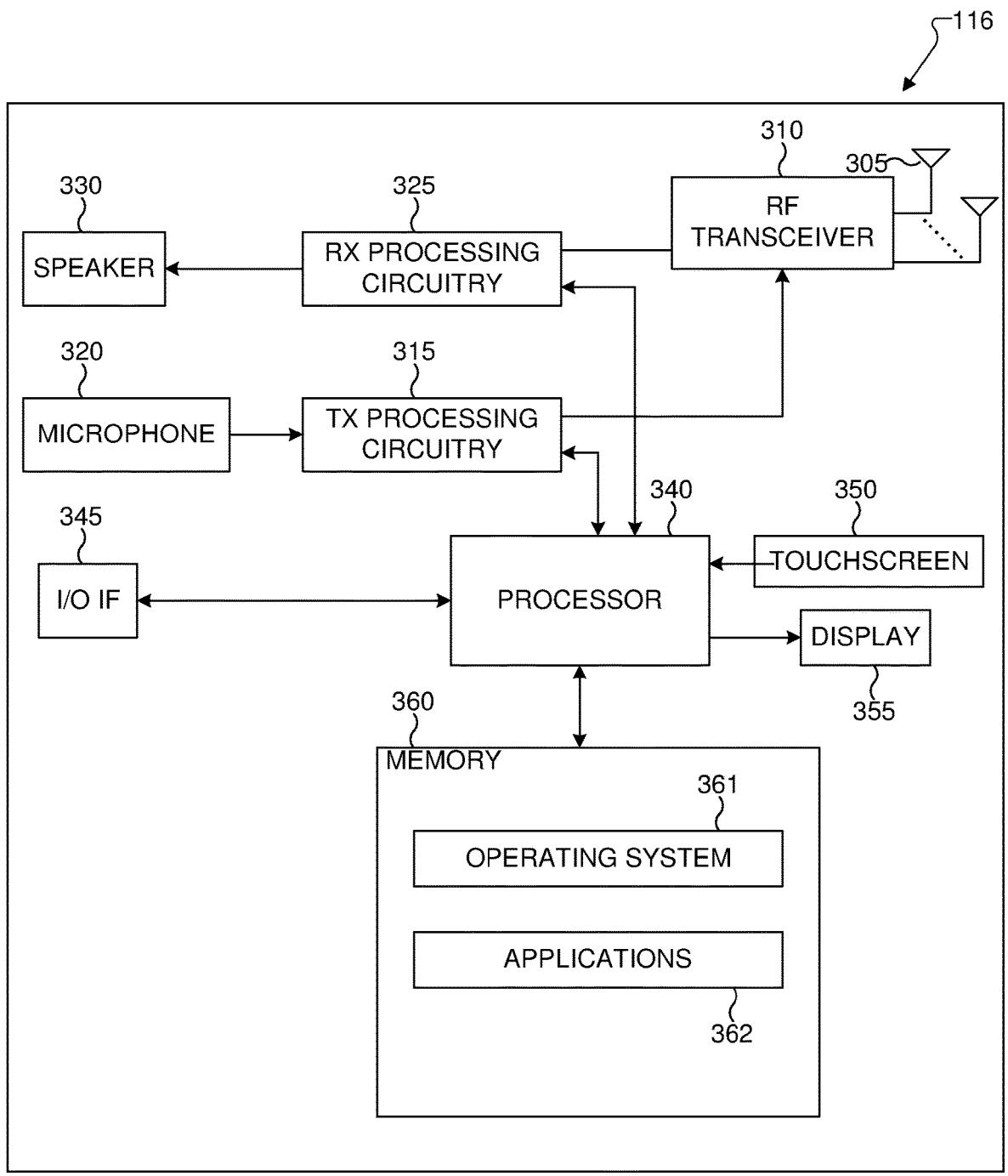
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for data transmission in ranging rounds. In certain embodiments, and one or more of the gNBs 101-103 includes circuitry, programing, or a combination thereof, for data transmission in ranging rounds.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for data transmission in ranging rounds. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
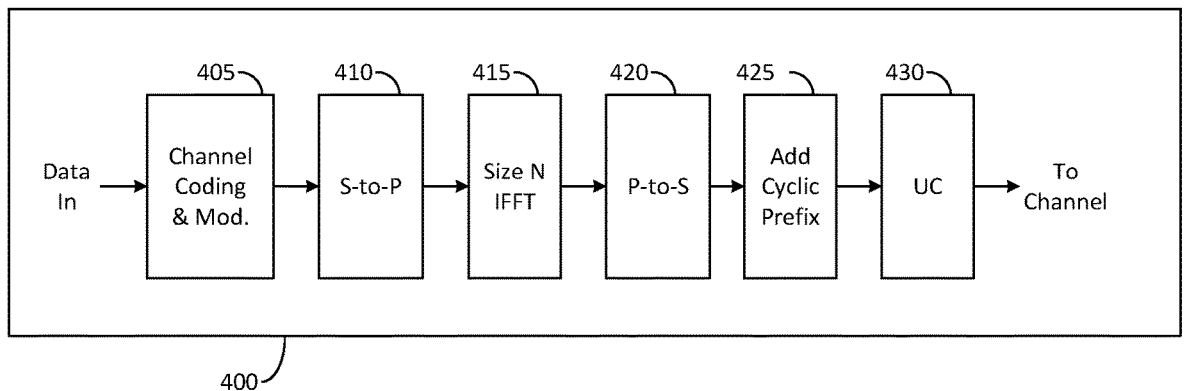
FIG. 4A illustrates a high-level diagram of an orthogonal frequency division multiple access transmit path according to embodiments of the present disclosure.
Figure 4B:
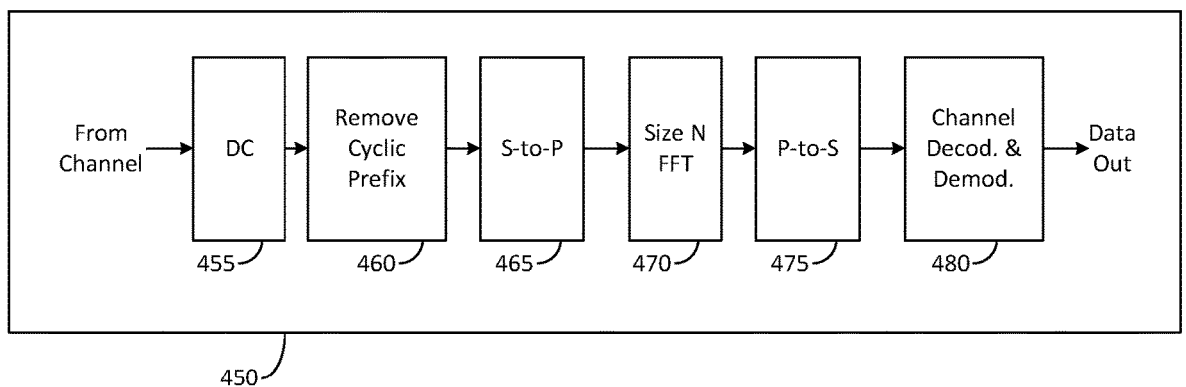
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). A wireless personal area network (WPAN) or simply a personal area network (PAN) may be a fully distributed communication network. A WPAN or PAN is communication network that allows wireless connectivity among the PAN devices (PDs). PAN devices and PAC devices may be interchangeably used as PAC network is also a PAN network and vice versa.

PAC networks may employ several topologies like mesh, star, and/or peer-to-peer, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
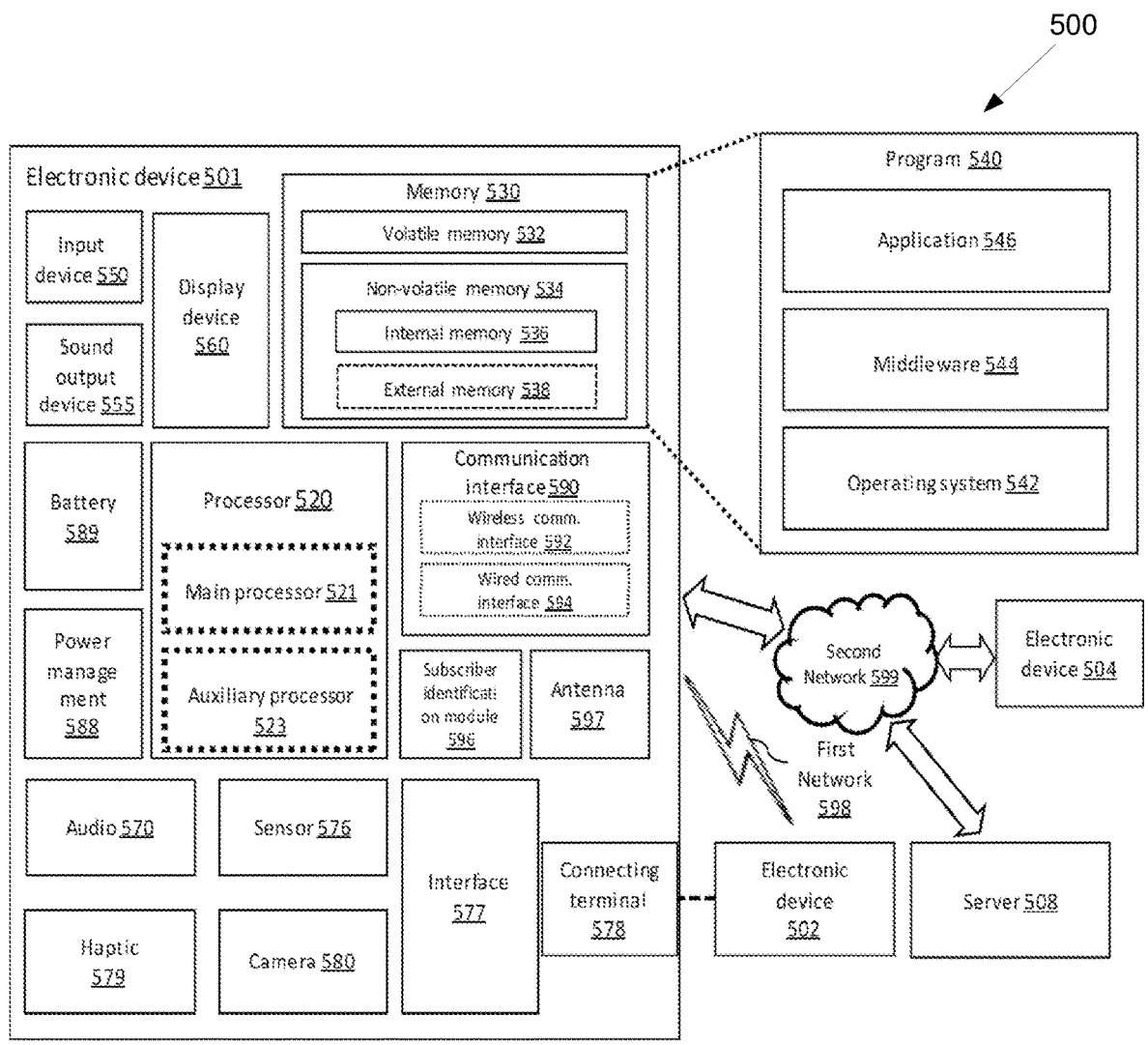
FIG. 5 illustrates an example electronic device according to embodiments of the present disclosure.

FIG. 5 illustrates an example electronic device 500 according to embodiments of the present disclosure. The embodiment of the electronic device 500 illustrated in FIG. 5 is for illustration only. FIG. 5 does not limit the scope of the present disclosure to any particular implementation.

PDs can be an electronic device that may have communication and ranging capability. The electronics device may be referred to as a ranging device (RDEV), or an enhanced ranging device (ERDEV), or a secure ranging device (SRDEV) or any other similar name in accordance with the IEEE standard specification. RDEV, ERDEV, or SRDEV can be a part of an access point (AP), a station (STA), an eNB, a gNB, a UE, or any other communication node with ranging capability.

FIG. 5 illustrates an example electronic device 505 in a network environment according to various embodiments. Referring to FIG. 5, the electronic device 500 in the network environment may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by another component (e.g., the processor 520) of the electronic device 101, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 101 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication.

In one embodiment, the electronic device 500 as illustrated in FIG. 5 may be implemented as a UE and/or a base station as illustrated in FIG. 1 (e.g., 111-116 and 101-103).

According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)).

These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508.

For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated components may still perform one or more functions of each of the plurality of components in the same or similar manner as one or more functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Impulse radio based on ultra-wideband communication technology uses short radio pulses for wireless communications. This has many advantages such as low-complexity transceiver design, large capacity by utilizing large bandwidth, and robustness to inter-symbol-interference (ISI) of multi-path environment. In addition, the characteristic of short radio pulses substantially reduces the probability of interception and eavesdropping by unintentded parties. This enables a secure communication for both data transmission and ranging. The IEEE 802.15.4z standard is presently developing the standards to improve the accuracy, integrity and efficiency of UWB based impulse radio communications.

Ranging and relative localization are essential for various location-based services and applications, e.g., Wi-Fi direct, internet-of-things (IoTs), etc. The number of networked devices in the wireless ecosystem is seeing an enormous growth, thus enormously increases the demand for ranging requests and the number of messages ranging related exchanged over the network. Presently, in the IEEE standard, ranging pairs are assigned dedicated resource elements in the contention-free-period (CFP) to fulfill the unicast, i.e., one-to-one, ranging in a sequential order. In addition, using broadcast transmissions, the number of required ranging exchanges can be reduced. For example, a device can initiate ranging with multiple responders by broadcasting a ranging frame.

Figure 6:
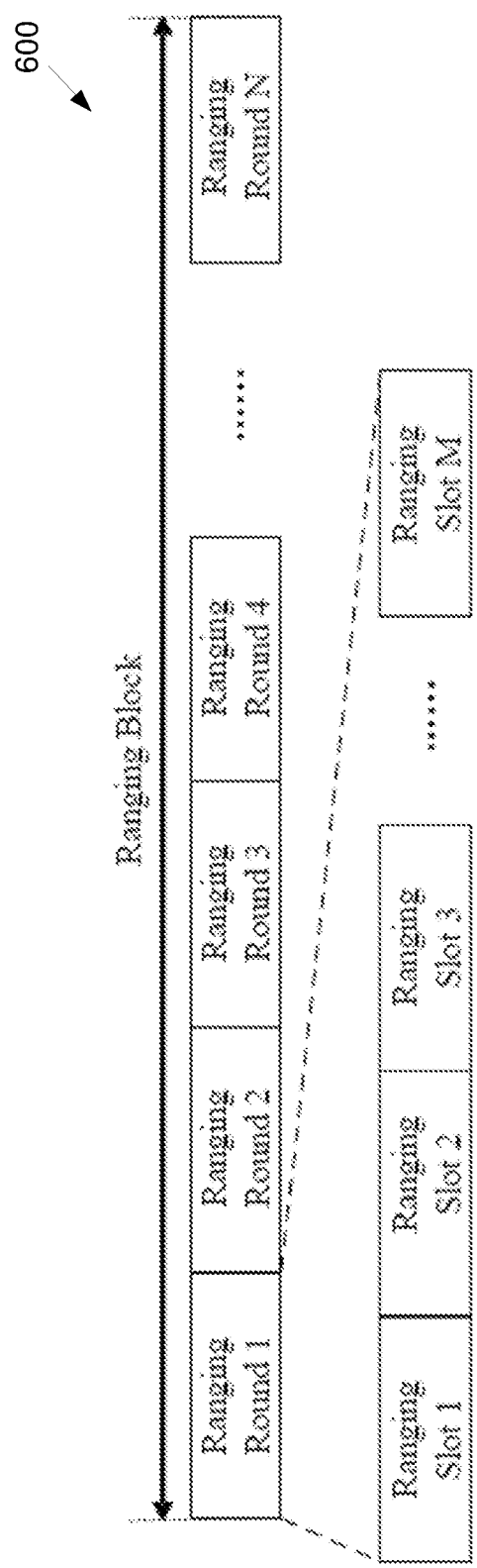
FIG. 6 illustrates an example ranging configuration: ranging block, ranging round and ranging slot according to embodiments of the present disclosure.

FIG. 6 illustrates an example ranging configuration 600: ranging block, ranging round and ranging slot according to embodiments of the present disclosure. The embodiment of the ranging configuration 600 illustrated in FIG. 6 is for illustration only. FIG. 6 does not limit the scope of the present disclosure to any particular implementation.

Figure 8:
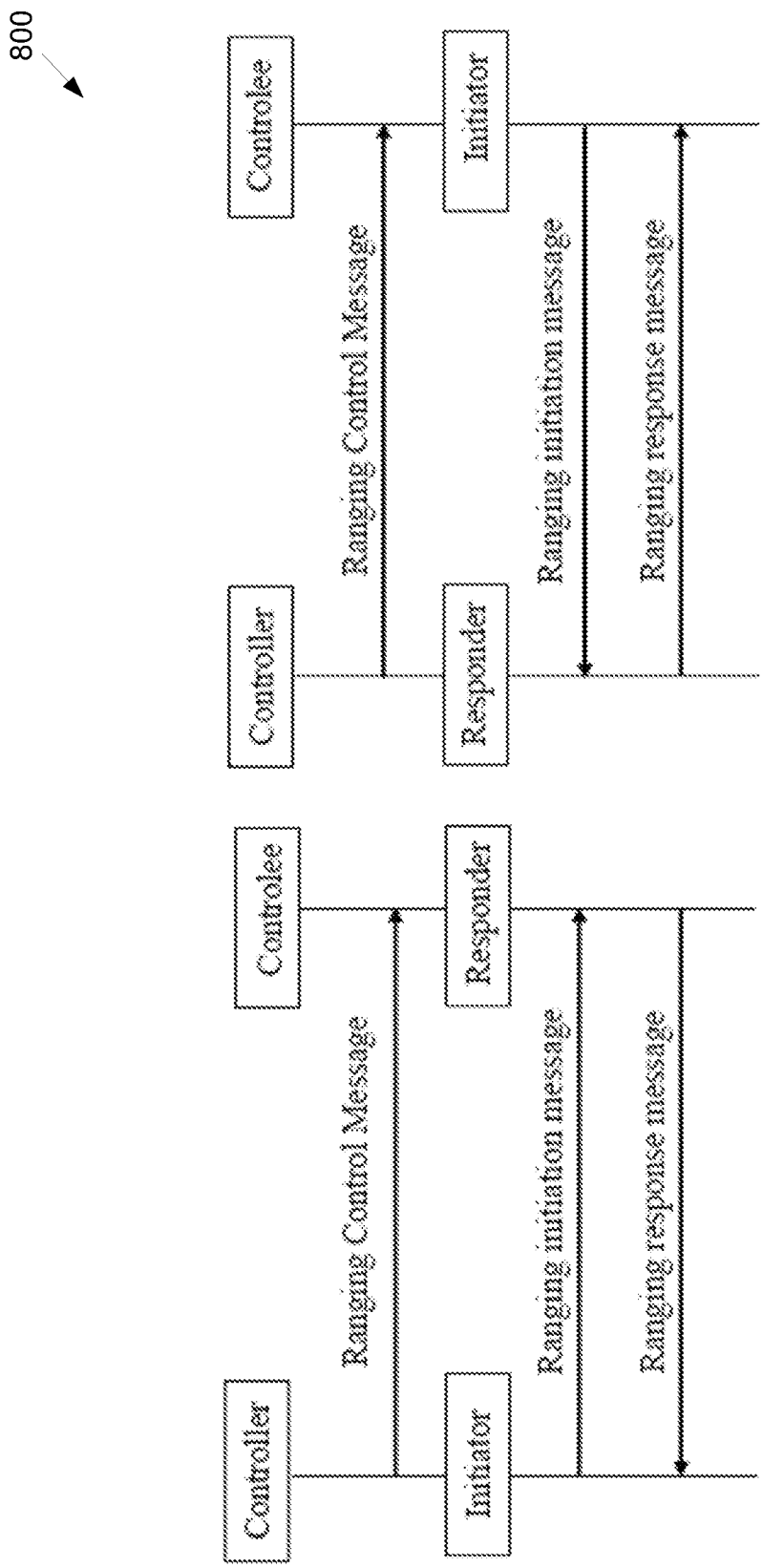
FIG. 8 illustrates an example ranging controller, controlee, initiator, and responder according to embodiments of the present disclosure.

In one embodiment, the ranging configuration 600 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

A ranging block is a time period for ranging. Each ranging block includes an integer multiple of ranging rounds, where a ranging round is the time period to complete of one entire range-measuring cycle involving the set of RDEV participating in the ranging measuring. Each ranging round is further subdivided into an integer number of ranging slots, where the ranging slot is a period of time of sufficient length for the transmission of at least one RFRAME. FIG. 6 shows the ranging block structure, with the ranging block divided into N ranging rounds, each consisting of M ranging slots.

Figure 7:
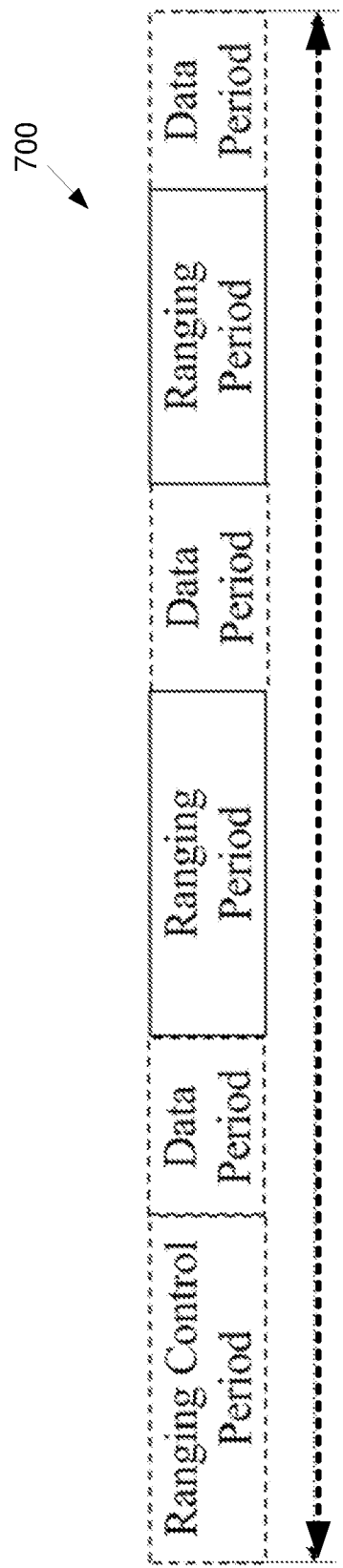
FIG. 7 illustrates an example general ranging round structure according to embodiments of the present disclosure.

FIG. 7 illustrates an example general ranging round structure 700 according to embodiments of the present disclosure. The embodiment of the general ranging round structure 700 illustrated in FIG. 7 is for illustration only. FIG. 7 does not limit the scope of the present disclosure to any particular implementation.

In one embodiment, the general ranging round structure 700 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

The general ranging round structure includes a ranging control period in which a ranging control message is transmitted to configure the ranging rounds. It is followed by one or more ranging periods and data periods. These data periods usually include transmission of ranging related data using certain information elements (IE) defined within the standard. The most generic ranging round structure is as shown in FIG. 7.

In the present disclosure, the following nomenclature is used: a controller (e.g., a ranging device that defines and controls the ranging parameters by sending ranging control message in ranging control period; a controlee (e.g., a ranging device that utilizes the ranging parameters received from the controller); an initiator (e.g., a ranging device that initiates a ranging exchange by sending the first message of the exchange or the device that send ranging ancillary data (in payload)/data); and a responder (e.g., a ranging device that receives ranging ancillary data (in payload)/data and/or responds to the message received from the initiator). These terms are illustrated in FIG. 8.

FIG. 8 illustrates an example ranging controller, controlee, initiator, and responder 800 according to embodiments of the present disclosure. The embodiment of the ranging controller, controlee, initiator, and responder 800 illustrated in FIG. 8 is for illustration only. FIG. 8 does not limit the scope of the present disclosure to any particular implementation.

In one embodiment, the controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

Figure 10:
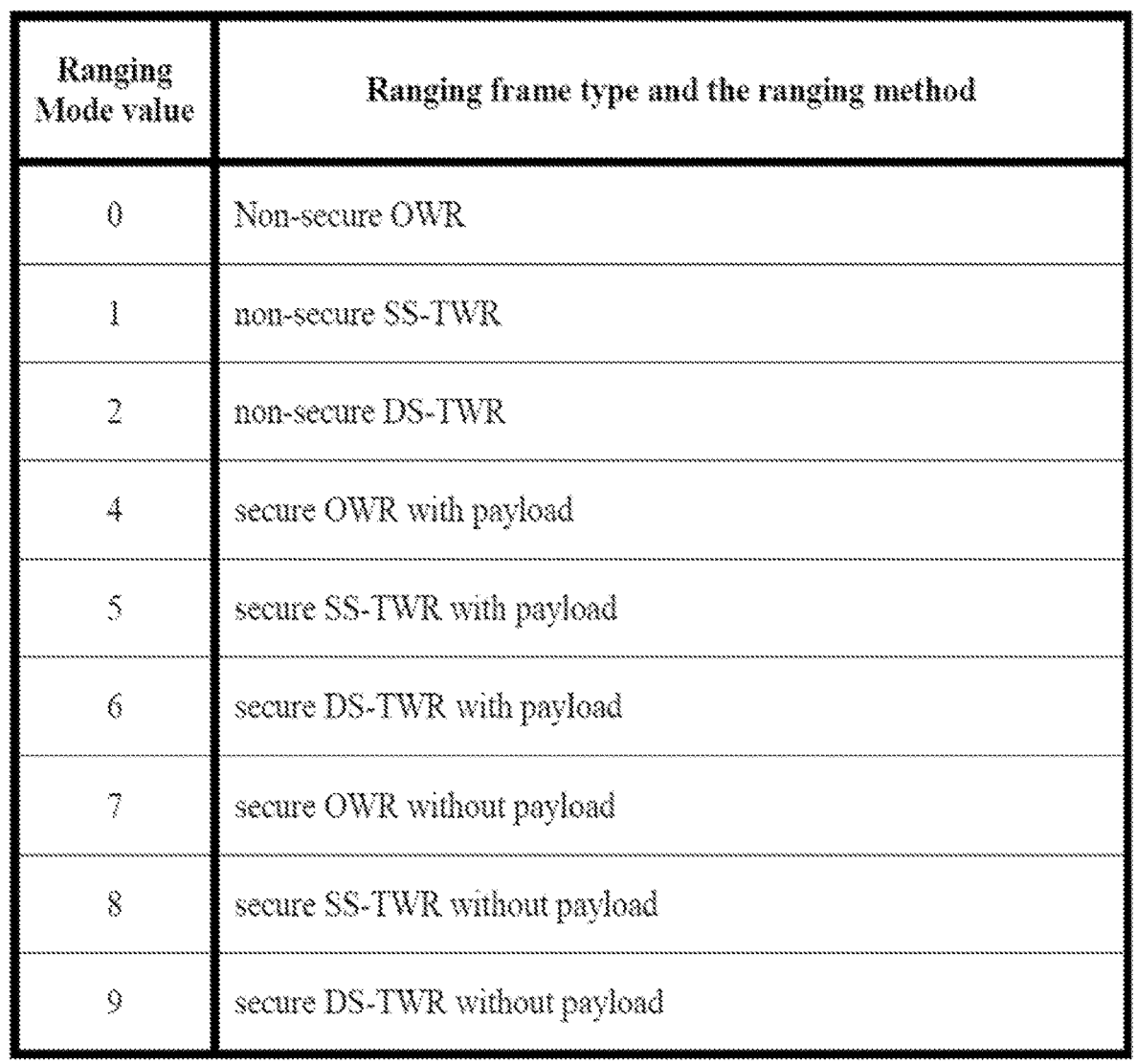
FIG. 10 illustrates an example ranging node values according to embodiments of the present disclosure.

A relevant IE for this is the advanced ranging control IE as shown in that is usually transmitted during the ranging control period. The advanced ranging control IE (ARC IE) is used by a controller to send the ranging configuration 22 information to a controlee (in a unicast frame) or multiple controlees (in multicast/broadcast frame). The content field of the ARC IE may be formatted as shown in FIG. 9. Ranging mode values are shown in FIG. 10. Other details of the ARC IE can be found in the IEEE standard specification.

FIG. 9 illustrates an example advanced ranging control IE 900 as defined in 802.15.4z according to embodiments of the present disclosure. The embodiment of the advanced ranging control IE 900 illustrated in FIG. 9 is for illustration only. FIG. 9 does not limit the scope of the present disclosure to any particular implementation.

In one embodiment, the advanced ranging control IE 900 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

FIG. 10 illustrates an example ranging node values 1000 according to embodiments of the present disclosure. The embodiment of the ranging node values 1000 illustrated in FIG. 10 is for illustration only. FIG. 10 does not limit the scope of the present disclosure to any particular implementation.

In one embodiment, the ranging node values 1000 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

Alternative structure of the advanced ranging control IE in 802.15.4z based on revisions is as shown in FIG. 11.

FIG. 11 illustrates an example advanced ranging control IE content field format 1100 as defined in 802.15.4z according to embodiments of the present disclosure. The embodiment of the advanced ranging control IE content field format 1100 illustrated in FIG. 11 is for illustration only. FIG. 11 does not limit the scope of the present disclosure to any particular implementation.

In one embodiment, the advanced ranging control IE content field format 1100 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

For the scheduling-based ranging with multiple devices, the ranging scheduling (RS) IE can be used to convey the resource assignment, which includes the field of RS table and RS table length as illustrated in FIG. 12. The field of RS table length indicates the number of rows in the RS table.

FIG. 12 illustrates an example ranging scheduling IE 1200 according to embodiments of the present disclosure. The embodiment of the ranging scheduling IE 1200 illustrated in FIG. 12 is for illustration only. FIG. 12 does not limit the scope of the present disclosure to any particular implementation.

In one embodiment, the ranging scheduling IE 1200 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

FIG. 13 illustrates an example row of ranging scheduling table 1300 according to embodiments of the present disclosure. The embodiment of the row of ranging scheduling table 1300 illustrated in FIG. 13 is for illustration only. FIG. 13 does not limit the scope of the present disclosure to any particular implementation.

In one embodiment, the row of ranging scheduling table 1300 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

Each row of The RS table includes a slot index field for a time slot, an address field of the device assigned to this slot, and a device type field to indicate the role of the assigned device as illustrated in FIG. 13. Depending on device capability and vendor specification, different types of address can be used. If the device type for a specific address is 0, the device is a responder. Otherwise, the device is an initiator.

Ranging ancillary data in this disclosure can be referred to by many names including but not limited to ranging ancillary information exchange, ranging ancillary message transfer, ranging ancillary information, among others.

Figure 14:
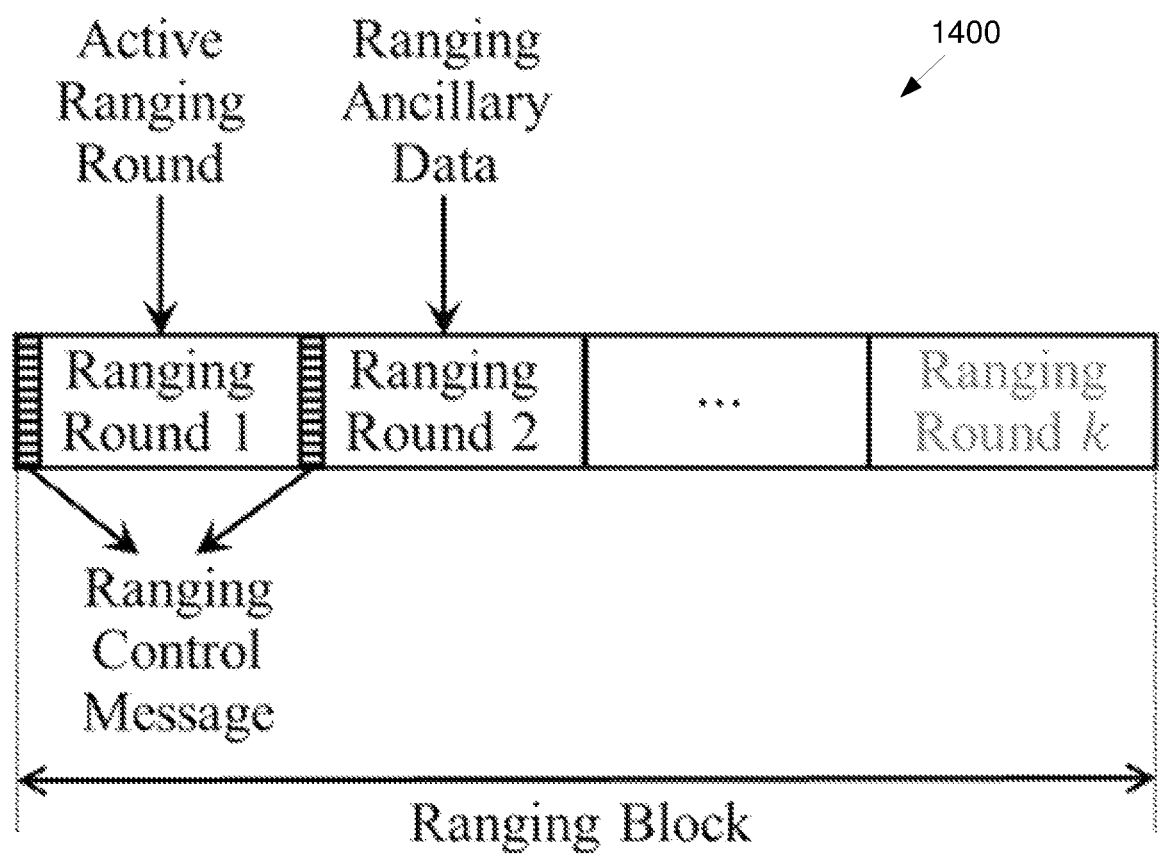
FIG. 14 illustrates an example ranging ancillary data (in payload) during ranging round according to embodiments of the present disclosure.

FIG. 14 illustrates an example ranging ancillary data (in payload) during ranging round 1400 according to embodiments of the present disclosure. The embodiment of the ranging ancillary data (in payload) during ranging round 1400 illustrated in FIG. 14 is for illustration only. FIG. 14 does not limit the scope of the present disclosure to any particular implementation.

In one embodiment, the example ranging ancillary data (in payload) during ranging round 1400 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

In one embodiment 1, methods to convey ranging ancillary data (in payload) is provided. Methods and framework for tandem ranging and data transmission during ranging rounds in UWB communication systems is described in the present disclosure. This embodiment describes the schemes and methodology to incorporate message or data transmissions with acknowledgements during ranging rounds of a ranging block. An illustration is shown in FIG. 14.

Figure 15:
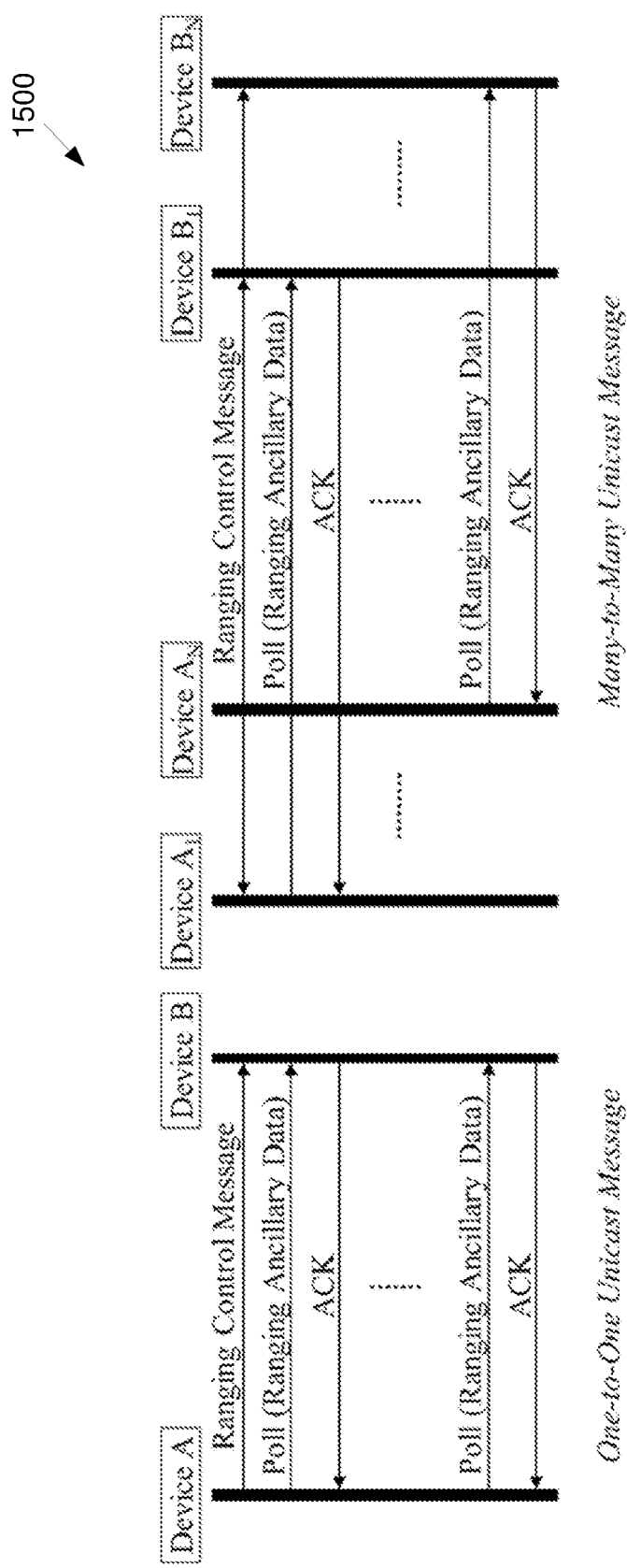
FIG. 15 illustrates an example messaging sequence for ranging ancillary data transmission according to embodiments of the present disclosure.

FIG. 15 illustrates an example messaging sequence for ranging ancillary data transmission 1500 according to embodiments of the present disclosure. The embodiment of the messaging sequence for ranging ancillary data transmission 1500 illustrated in FIG. 15 is for illustration only. FIG. 15 does not limit the scope of the present disclosure to any particular implementation.

In one embodiment, the messaging sequence for ranging ancillary data transmission 1500 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103). As illustrated in FIG. 15, a device A and device B may be a controller and controlee, as illustrated in FIG. 8, that may be implemented as an electronic device as illustrated in FIG. 5.

Illustrations of ranging ancillary data (in payload) for unicast and many-to-many are shown in FIG. 15. This does not preclude other scenarios like multicast, broadcast, etc. a ranging control message conveys the information needed for ranging ancillary data (in payload) and each message can also be acknowledged based on the request. This acknowledgement may be scheduled by the controller but may also be an immediate acknowledgement. The acknowledgement request can be requested out-of-band via higher layer exchange or via other mechanisms in-band such as indicating in the MAC header of the data frame.

FIG. 16 illustrates an example ranging mode value for ranging ancillary data (in payload) 1600 according to embodiments of the present disclosure. The embodiment of the ranging mode value for ranging ancillary data (in payload) 1600 illustrated in FIG. 16 is for illustration only. FIG. 16 does not limit the scope of the present disclosure to any particular implementation.

In one embodiment, the example ranging mode value for ranging ancillary data (in payload) 1600 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

FIG. 17 illustrates an example ranging mode value 1700 for ranging ancillary data (in payload) with and without RFRAME according to embodiments of the present disclosure. The embodiment of the ranging mode value 1700 illustrated in FIG. 17 is for illustration only. FIG. 17 does not limit the scope of the present disclosure to any particular implementation.

In one embodiment, the ranging mode value 1700 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

In one embodiment, a scheme to convey the ranging ancillary data using advanced ranging control IE is provided. New modes are defined in the ranging mode value of the advanced ranging control IE, a few examples of which are as illustrated in FIG. 16 and FIG. 17.

FIG. 18 illustrates a flow chart of a method 1800 for utilizing ranging mode value to indicate ranging ancillary data (in payload) according to embodiments of the present disclosure. The embodiment of the method 1800 illustrated in FIG. 18 is for illustration only. FIG. 18 does not limit the scope of the present disclosure to any particular implementation.

In one embodiment, the method 1800 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

As illustrated in FIG. 18, the method 1800 begins at step 1802. In step 1802, a ranging control message is received. In step 1804, the method determines whether a ranging mode value indicates a ranging ancillary data. If the method determines that the ranging mode value indicates the ranging ancillary data, the method performs step 1806. In step 1806, a reception of ranging ancillary data is expected. In step 1805, if the method determines that the ranging mode value does not indicate the ranging ancillary data, the method performs step 1808. In step 1808, the ranging ancillary data is not received.

Note that other values for ranging mode to represent ranging ancillary data (in payload) is not precluded. Upon reading the ranging mode value, the receiver device can discern that the ranging round may be utilized for a ranging ancillary data (in payload). This is described as a flowchart in FIG. 18.

This enables data communication within a ranging round without breaking the current session. This also enables to utilize the inactive ranging rounds within a block for transmission of information or message or data as may be required without breaking the current ranging session or initiating a new session for data transfer. This is used in conjunction with the ranging scheduling IE to schedule the ranging ancillary data (in payload) poll (or Data) and acknowledgements as may be required. This can also be used in conjunction with the contention period IE. For the purpose of ranging ancillary data (in payload), an initiator sends data/message and a responder receives data/message.

In one embodiment, a scheme to convey the ranging ancillary data (in payload) using ranging ancillary Data IE is provided.

FIG. 19 illustrates an example ranging ancillary data (in payload) IE 1900 according to embodiments of the present disclosure. The embodiment of the ranging ancillary data (in payload) IE 1900 illustrated in FIG. 19 is for illustration only. FIG. 19 does not limit the scope of the present disclosure to any particular implementation.

In one embodiment, the ranging ancillary data (in payload) IE 1900 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

A ranging round can be used for ranging ancillary data (in payload) using the ranging ancillary data (in payload) IE. This IE can be formatted as shown in FIG. 19.

A schedule mode field specifies the ranging used in the following ranging rounds is contention-based or schedule-based. When the schedule mode=0, a contention-based ranging is used for the following rounds. When the schedule mode=1, a scheduled-based ranging is used for the following rounds. When the schedule mode=0, ranging initiator/responder list IE and ranging contention period IE can be invoked. When the schedule mode=1, a ranging scheduling IE can be invoked.

Timing parameters indicated whether columns 3-7 are present or not. If the timing parameters=1, then columns 3-7 are present. Else, the ranging ancillary data (in payload) transmission follows the time structure already in place as conveyed either through higher layers or advanced ranging control IE or other means.

The time structure indicator field specifies whether the ranging used in the following ranging rounds is interval-based mode (0) invoking ranging interval update IE or block-based mode (1) invoking ranging round start IE, next ranging round IE and ranging block update IE.

The Block length multiplier field specifies the multiplier of the minimum block length to calculate the length of ranging block.

The number of active ranging rounds specifies the number of active ranging Rounds managed by the ARC IE. The minimum block length field specifies the length (duration) of minimum length of ranging block. A length of ranging slot specifies the length (duration) of each ranging slot.

In one embodiment, a scheme to convey the ranging ancillary data using reserved bits in advanced ranging control IE is provided.

A one-bit field in an existing information element of the 802.15.4z or any such similar standard, such the advanced ranging control IE (does not preclude other IEs) may be used as an indicator to configure the ranging round for ranging ancillary data transfer.

Figure 20:
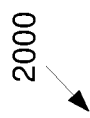
FIG. 20 illustrates an example ranging ancillary data (in payload) IE with message mode according to embodiments of the present disclosure.

FIG. 20 illustrates an example ranging ancillary data (in payload) IE with message mode 2000 according to embodiments of the present disclosure. The embodiment of the ranging ancillary data (in payload) IE with message mode 2000 illustrated in FIG. 20 is for illustration only. FIG. 20 does not limit the scope of the present disclosure to any particular implementation.

In one embodiment, the ranging ancillary data (in payload) IE with message mode 2000 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

FIG. 21 illustrates an example ranging ancillary data (in payload) bit in ARC IE 2100 to indicate ranging ancillary data transfer according to embodiments of the present disclosure. The embodiment of the ranging ancillary data (in payload) bit in ARC IE 2100 illustrated in FIG. 21 is for illustration only. FIG. 21 does not limit the scope of the present disclosure to any particular implementation.

In one embodiment, the ranging ancillary data (in payload) bit in ARC IE 2100 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

A reserved bit from the advanced ranging control IE may be used as an indicator to indicate that the current ranging round may be used for ranging ancillary data transfer. An illustration of fields of the ARC IE to support this is shown in the FIG. 21 for two formats of the ARC, while other formats of ARC IE or any other IE are not precluded. For the ranging round to be configured to be used to transfer ranging ancillary data, the ranging ancillary data (in payload) bit is set to 1, else the bit is set to 0.

Figures 22, 23:
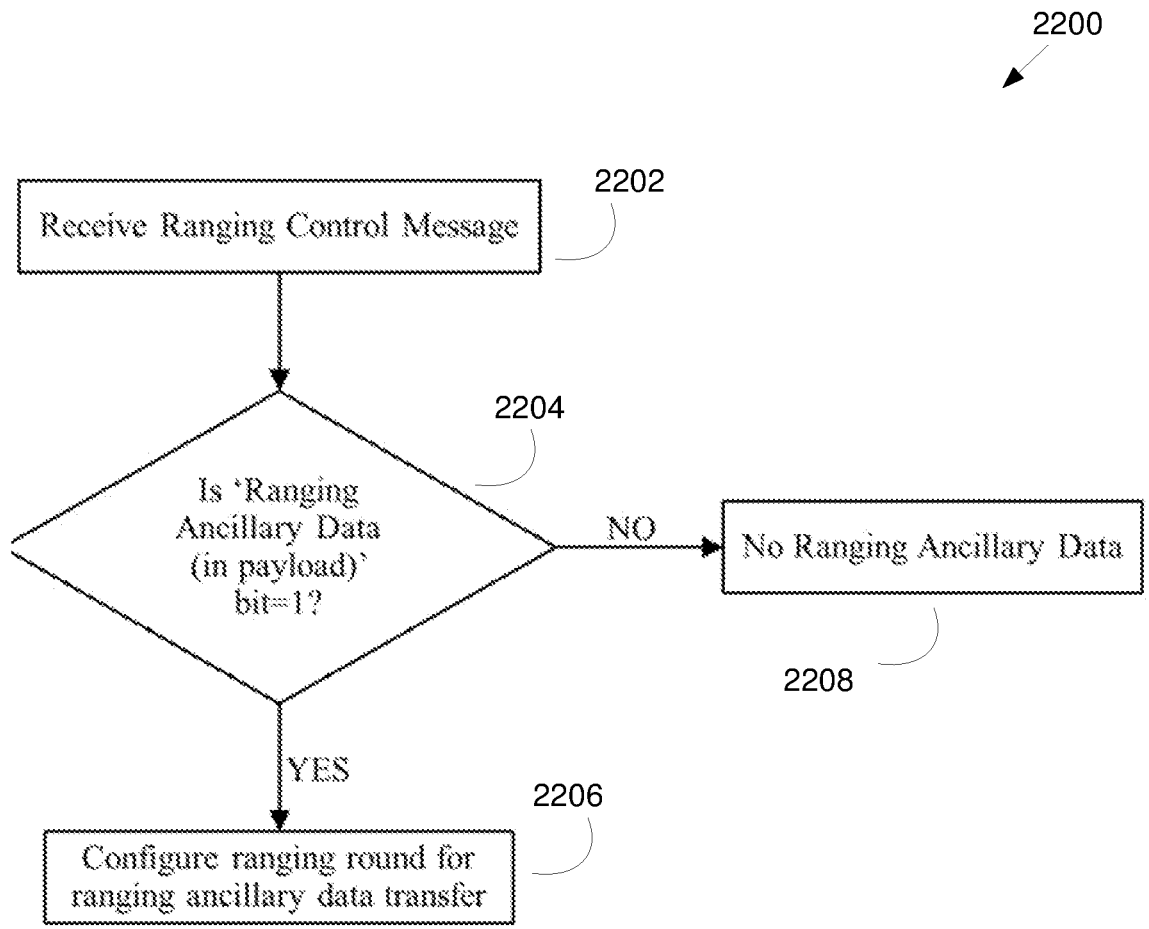
FIG. 22 illustrates a flowchart of a method for indicating ranging ancillary data transfer using the ranging ancillary data (in payload) bit in ARC IE according to embodiments of the present disclosure.
FIG. 23 illustrates an example ranging method field value used to indicate ranging ancillary information Exchange (or data transfer) according to embodiments of the present disclosure.

FIG. 22 illustrates a flowchart of a method 2200 for indicating ranging ancillary data transfer using the ranging ancillary data (in payload) bit in ARC IE according to embodiments of the present disclosure. The embodiment of the method 2200 illustrated in FIG. 22 is for illustration only. FIG. 22 does not limit the scope of the present disclosure to any particular implementation.

In one embodiment, the method 2200 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

For the ranging round to be configured to be used to transfer ranging ancillary data, the ranging ancillary data (in payload) bit is set to 1, else the bit is set to 0. The flowchart is shown in FIG. 22.

As illustrated in FIG. 22, the method 2200 begins at step 2202. In step 2202, a ranging control message is received. In step 2204, the method determines whether a "ranging ancillary data (in payload)" bit=1. In step 2204, if the method determines that "ranging ancillary data (in payload)" bit=1, the method performs step 2206. In step 2206, a ranging round is configured for ranging ancillary data transfer. In step 2204, if the method determines that "ranging ancillary data (in payload)" bit is not set to 1, the method performs step 2208. In step 2208, the ranging ancillary data is not received.

In one embodiment, a scheme to convey the ranging ancillary data using ranging method field in advanced ranging control IE.

FIG. 23 illustrates an example ranging method field value 2300 used to indicate ranging ancillary information exchange (or data transfer) according to embodiments of the present disclosure. The embodiment of the ranging method field value 2300 illustrated in FIG. 23 is for illustration only. FIG. 23 does not limit the scope of the present disclosure to any particular implementation.

In one embodiment, the ranging method field value 2300 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

Figure 24:
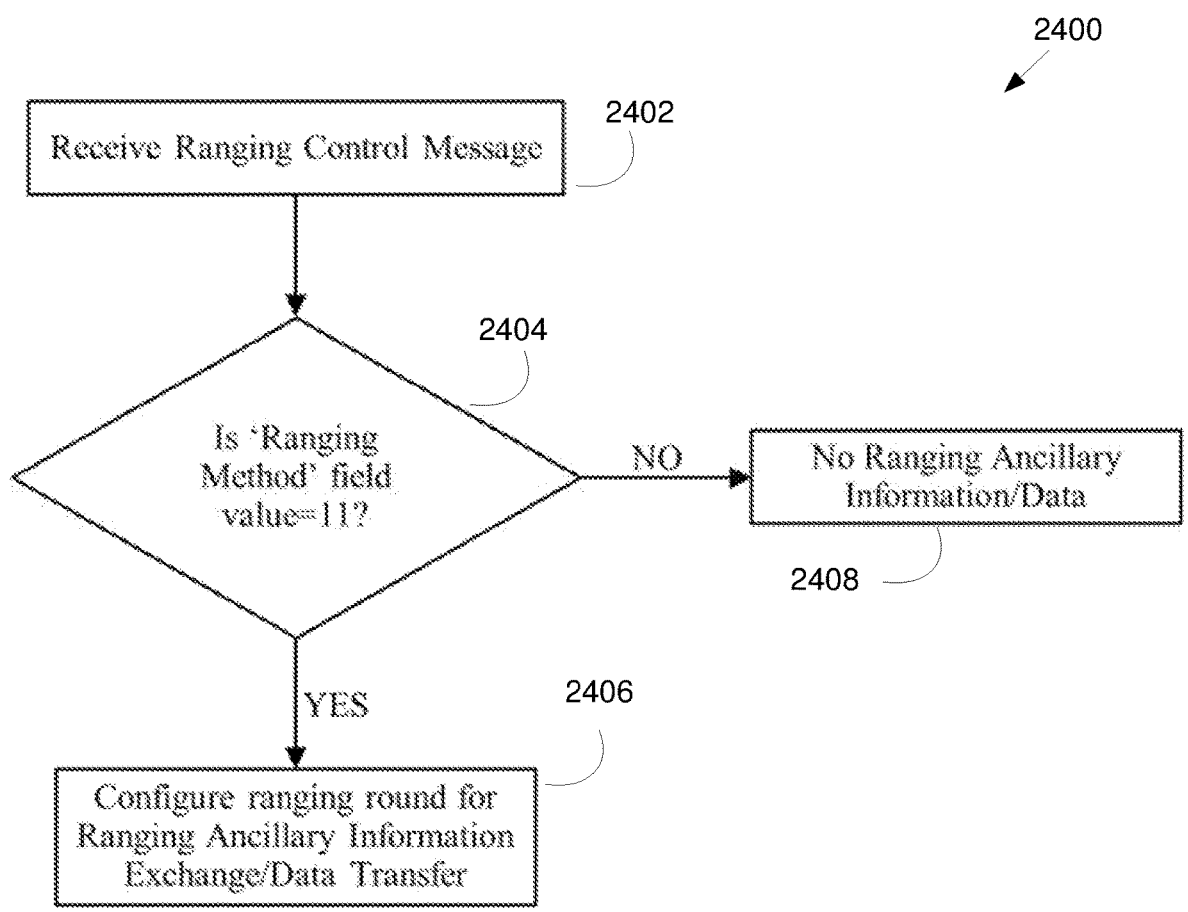
FIG. 24 illustrates a flowchart of a method for indicating ranging ancillary information exchange or data transfer using the ranging method field in ARC IE according to embodiments of the present disclosure.

FIG. 24 illustrates a flowchart of a method 2400 for indicating ranging ancillary information exchange or data transfer using the ranging method field in ARC IE according to embodiments of the present disclosure. The embodiment of the method 2400 illustrated in FIG. 24 is for illustration only. FIG. 24 does not limit the scope of the present disclosure to any particular implementation.

In one embodiment, the method 2400 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

As illustrated in FIG. 24, the method 2400 begins at step 2402. In step 2402, a ranging control message is received. In step 2404, the method determines whether a "ranging method" field value is set to 11. In step 2404, if the method determines that the "ranging method" field value is set to 11, the method performs step 2406. In step 2406, a ranging round is configured for ranging ancillary information exchange/data transfer. In step 2404, if the method determines that the "ranging method" field value is not set to 11, the method performs step 2408. In step 2408, the ranging ancillary information/data is not received.

The ranging method field of ARC IE may be used to convey that the round is being used for ranging ancillary information exchange or ranging ancillary data. An illustration of the ranging method field of 11 being used to indicate ranging ancillary information exchange (or data transfer) is shown in FIG. 23. The illustrative flowchart is shown in FIG. 24.

In one embodiment, ranging ancillary data/message counter and type are provided (e.g., ranging ancillary data/message counter and type (RADCT) IE).

Based on the length of the message, a given message may last multiple "polls." In order to inform how many frames (or polls) follow the current poll to complete the message, ranging ancillary data/message counter and type (RADCT) IE is included in the "poll (data)" to indicate the number of frames remaining for the current message to complete. Further, the message type can be conveyed using a "message type" field. The RADCT IE can be formatted as shown in FIG. 25.

Figure 25:
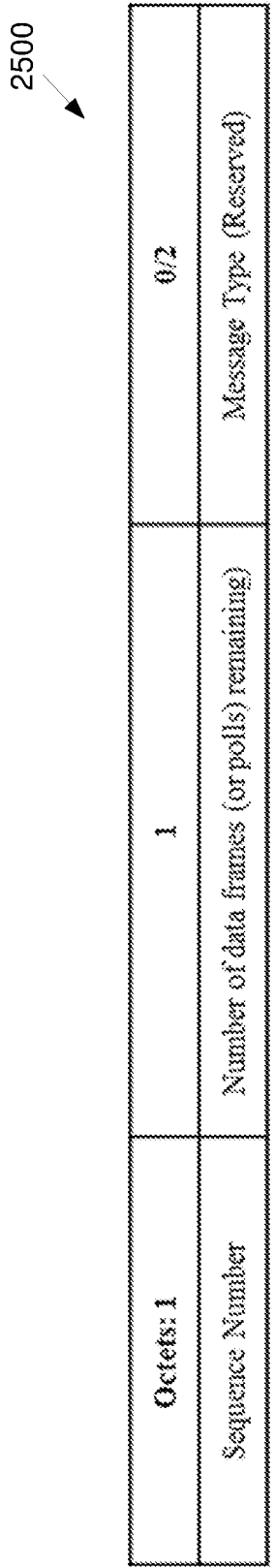
FIG. 25 illustrates an example ranging ancillary data (in payload) counter and type IE format according to embodiments of the present disclosure.

FIG. 25 illustrates an example ranging ancillary data (in payload) counter and type IE format 2500 according to embodiments of the present disclosure. The embodiment of the ranging ancillary data (in payload) counter and type IE format 2500 illustrated in FIG. 25 is for illustration only. FIG. 25 does not limit the scope of the present disclosure to any particular implementation.

In one embodiment, the ranging ancillary data (in payload) counter and type IE format 2500 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103). Other ways of conveying the message include but not limited to adding additional fields in advanced ranging control IE, ranging ancillary data IE and/or defining an exclusive IE for this purpose.

Figure 26:
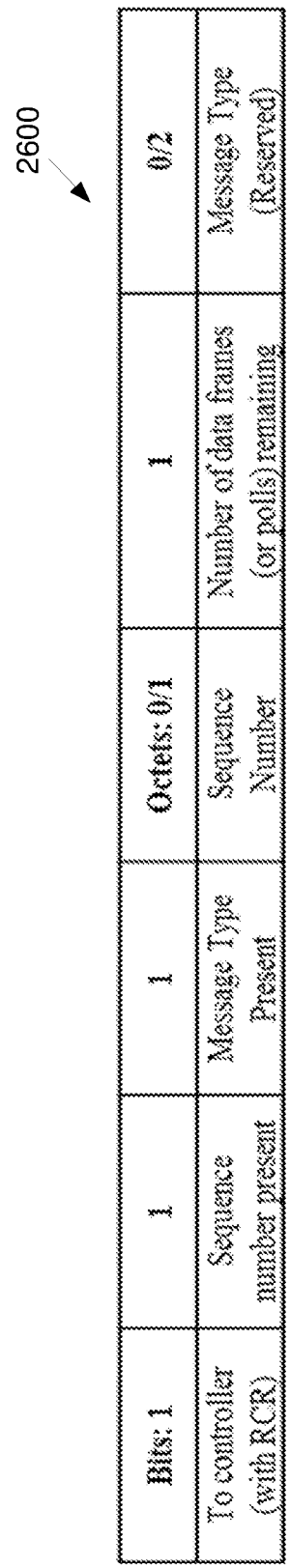
FIG. 26 illustrates an example ranging ancillary information message counter and type IE content field format according to embodiments of the present disclosure.

FIG. 26 illustrates an example ranging ancillary information message counter and type IE content field format 2600 according to embodiments of the present disclosure. The embodiment of the ranging ancillary information message counter and type IE content field format 2600 illustrated in FIG. 26 is for illustration only. FIG. 26 does not limit the scope of the present disclosure to any particular implementation.

In one embodiment, the ranging ancillary information message counter and type IE content field format 2600 may be used by a controller and/or controlee as illustrated in FIG. 8. The controller and/or controlee as illustrated in FIG. 8 may be implemented in an electronic device as illustrated in FIG. 5 that may be implemented as a UE and/or base station as illustrated in FIG. 1 (e.g., 111-116 and 101-103).

In one embodiment, ranging ancillary information message counter and Type IE are provided. The ranging ancillary information message counter and Type IE (RAICT IE) is used during ranging ancillary information exchange (in payload). This IE may be formatted as illustrated in FIG. 26.

Initiator uses this IE in two ways: to convey to the responder the sequence number of the current data frame, number of ranging ancillary data frames remaining to complete this message and the message type; and used to request the controller to schedule the number of slots as specified in number of data frames (or polls) remaining.

To controller (with RCR) bit is set to 1 to use RADCT IE to request the slots from controller. Else it is set to 0. Sequence number present bit is set to 1 if Sequence number of present, else it is set to 0. A message type present bit is set to 1 if the message type is being conveyed. A sequence number is an octet that conveys the MAC frame sequence number. A number of data frames (or polls) remaining conveys to the responder the number of ranging ancillary data frames remaining to complete the present message/data. In the present disclosure, the RADCT IE may be used as an RAICT IE. In the present disclosure, an RADCT IE and RAICT IE may be exchangeable and switchable. In the present disclosure, both RADCT IE and RAICT IE may have the same usage and contents.

Figure 27:
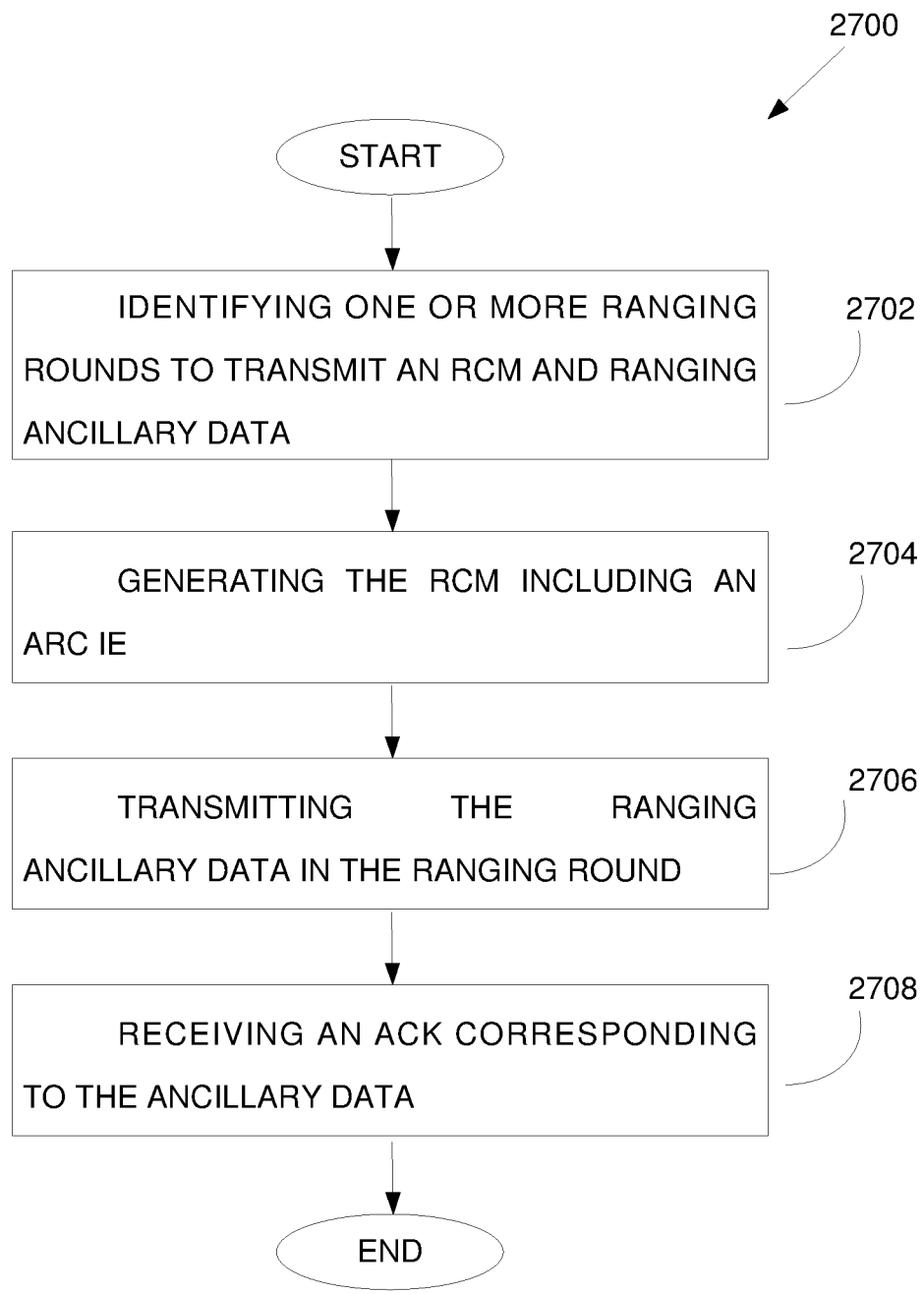
FIG. 27 illustrates a flowchart of a method for data transmission in ranging rounds in UWB communication systems according to embodiments of the present disclosure.

FIG. 27 illustrates a flowchart of a method 2700 for data transmission in ranging rounds in UWB communication systems according to embodiments of the present disclosure, may be performed by a network entity (e.g., 101-103 as illustrated in FIGS. 1 and 500 as illustrated in FIG. 5). The embodiment of the electronic device 500 illustrated in FIG. 27 is for illustration only. FIG. 27 does not limit the scope of the present disclosure to any particular implementation.

In one embodiment, the method 2700 may be used by a controller and/or controlee as illustrated in FIG. 8. The controller and/or controlee as illustrated in FIG. 8 may be implemented in an electronic device as illustrated in FIG. 5 that may be implemented as a network entity and/or base station as illustrated in FIG. 1 (e.g., 101-103).

As illustrated in FIG. 27, the method 2700 begins at step 2702. In step 2702, the network entity identifies, in a ranging block, one or more ranging rounds to transmit a ranging control message (RCM) and ranging ancillary data.

Subsequently, in step 2704, the network entity generates the RCM including an advanced ranging control information element (ARC IE) that includes a ranging method field, wherein the ranging method field includes a value that indicates whether a ranging round following the RCM is used for ranging ancillary information exchange.

In one embodiment, the ranging method field is configured to indicate: a one-way ranging (OWR) when the ranging method field is set to zero; a single-sided two-way ranging (SS-TWR) when the ranging method field is set to one; a double-sided two-way ranging (DS-TWR) when the ranging method field is set to two; and the ranging ancillary information exchange when the ranging method field is set to three.

Next, in step 2706, the first network entity transmits, to a second network entity, the ranging ancillary data in the ranging round following the RCM when the value included in the ranging method field corresponds to ranging ancillary information exchange.

Finally, in step 2708, the first network entity receives, from the second network entity, an acknowledgement (ACK) corresponding to the ranging ancillary data.

In one embodiment, the first network entity transmits, to a group of network entities including the second network entity, the ranging ancillary data in the ranging round following the RCM when the value included in the ranging method field corresponds to the ranging ancillary information exchange.

In one embodiment, the first network entity receives, from the group of network entities including the second network entity, ACKs corresponding to the ranging ancillary data.

In one embodiment, the first network entity, during exchanging ranging ancillary information, generates ranging ancillary information message counter and type IE (RAICT IE), wherein the RAICT IE includes: a ranging or ancillary message number present field indicating whether a sequence number field is present in the RAICT IE; a reserved field; the ranging or ancillary message number field indicating a medium access control (MAC) frame sequence number; and a frames remaining field indicating a number of frames remaining to complete the ranging ancillary data.

In one embodiment, the first network entity transmits, to the second network entity, the RAICT IE to indicate a ranging or ancillary message number of a data frame being transmitted and a number of ranging ancillary data frames remaining to complete the data frame that is a message or a message type.

In such embodiment, the first network entity is an initiator that initiates a ranging exchange by sending, to the second network entity, a message first or sends, to the second network entity, ranging ancillary information; and the second network entity is a responder that receives, from the first network entity, the ranging ancillary information and responds to the message firstly received from the first network entity.

In one embodiment, the first network entity receives the RAICT IE including a request field. In such embodiment, the request field indicates that the RAICT IE requests for the first network entity to schedule a number of slots; the first network entity is a controller that transmits, to the second network entity, a ranging round usage for a data transmission based on the scheduled number of slots; and the second network entity is a controlee that requests for the first network entity to schedule the number of slots.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. An initiator in a wireless communication system, the initiator comprising:
    a processor configured to identify a ranging round used for a ranging ancillary information exchange based on a ranging control message (RCM); and
    a transceiver operably coupled to the processor, the transceiver configured to transmit, to a responder over a plurality of messages spanning a plurality of ranging slots in the ranging round, ranging ancillary information by using a ranging ancillary information message counter and type information element (RAICT IE),
    wherein the RAICT IE includes a field indicating a number of data frames remaining to complete transmission of the ranging ancillary information.

2. The initiator of claim 1, wherein the RCM includes an advanced ranging control information element (ARC IE) indicating that the ranging round is used for the ranging ancillary information exchange.

3. The initiator of claim 2, wherein:
    the ARC IE includes a field indicating a usage of one or more ranging rounds following the RCM, and
    the field indicating the usage includes one of values respectively corresponding to a one-way ranging (OWR), a single-sided two-way ranging (SS-TWR), a double-sided two-way ranging (DS-TWR), and the ranging ancillary information exchange.

4. The initiator of claim 1, wherein the RAICT IE further includes a field indicating a sequence number of a current data frame.

5. The initiator of claim 1, wherein, in case that the initiator is a controlee and the responder is a controller, the RAICT IE is used to request the controller to schedule a number of slots based on the remaining number of data frames.

6. The initiator of claim 5, wherein the RAICT IE further includes a field indicating that the RAICT IE is used to request the number of slots from the controller.

7. The initiator of claim 1, wherein the transceiver is further configured to transmit, to the responder, the RCM including information associated with the ranging ancillary information exchange in case that the initiator is a controller.

8. A responder in a wireless communication system, the responder comprising:
    a processor configured to identify a ranging round used for a ranging ancillary information exchange based on a ranging control message (RCM); and
    a transceiver operably coupled to the processor, the transceiver configured to receive, from an initiator over a plurality of messages spanning a plurality of ranging slots in the ranging round, ranging ancillary information by using a ranging ancillary information message counter and type information element (RAICT IE)
    wherein the RAICT IE includes a field indicating a number of data frames remaining to complete transmission of the ranging ancillary information.

9. The responder of claim 8, wherein the RCM includes an advanced ranging control information element (ARC IE) indicating that the ranging round is used for the ranging ancillary information exchange.

10. The responder of claim 9, wherein:
    the ARC IE includes a field indicating a usage of one or more ranging rounds following the RCM, and
    the field indicating the usage includes one of values respectively corresponding to a one-way ranging (OWR), a single-sided two-way ranging (SS-TWR), a double-sided two-way ranging (DS-TWR), and the ranging ancillary information exchange.

11. The responder of claim 8, wherein the RAICT IE further includes a field indicating a sequence number of a current data frame.

12. The responder of claim 8, wherein, in case that the initiator is a controlee and the responder is a controller, the RAICT IE is used to request the controller to schedule a number of slots based on the remaining number of data frames.

13. The responder of claim 12, wherein the RAICT IE further includes a field indicating that the RAICT IE is used to request the number of slots from the controller.

14. The responder of claim 8, wherein the transceiver is further configured to transmit, to the responder, the RCM including information associated with the ranging ancillary information exchange in case that the initiator is a controller.

15. A method performed by an initiator in a wireless communication system, the method comprising:
    identifying a ranging round used for a ranging ancillary information exchange based on a ranging control message (RCM); and
    transmitting, to a responder over a plurality of messages spanning a plurality of ranging slots in the ranging round, ranging ancillary information by using a ranging ancillary information message counter and type information element (RAICT IE),
    wherein the RAICT IE includes a field indicating a number of data frames remaining to complete the transmission of the ranging ancillary information.

16. The method of claim 15, wherein the RCM includes an advanced ranging control information element (ARC IE) indicating that the ranging round is used for the ranging ancillary information exchange.

17. The method of claim 16, wherein:
    the ARC IE includes a field indicating a usage of one or more ranging rounds following the RCM, and
    the field indicating the usage includes one of values respectively corresponding to a one-way ranging (OWR), a single-sided two-way ranging (SS-TWR), a double-sided two-way ranging (DS-TWR), and the ranging ancillary information exchange.

18. The method of claim 15, wherein the RAICT IE further includes a field indicating a sequence number of a current data frame.

19. The method of claim 15, wherein:
    in case that the initiator is a controlee and the responder is a controller, the RAICT IE is used to request the controller to schedule a number of slots based on the remaining number of data frames, and wherein the RAICT IE further includes a field indicating that the RAICT IE is used to request the number of slots from the controller.

20. The method of claim 15, further comprising transmitting, to the responder, the RCM including information associated with the ranging ancillary information exchange in case that the initiator is a controller.

* * * * *